United States Patent
Janscha (10) Patent No.: US 10,651,539 B2
(45) Date of Patent: May 12, 2020

(54) MOUNTING ARRANGEMENT FOR WIRELESS COMMUNICATION BOARD FOR A PORTABLE GENERATOR

(71) Applicant: Briggs & Stratton Corporation, Wauwatosa, WI (US)

(72) Inventor: Ryan D. Janscha, Brookfield, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 232 days.

(21) Appl. No.: 15/585,534

(22) Filed: May 3, 2017

(65) Prior Publication Data

US 2017/0324145 A1    Nov. 9, 2017

Related U.S. Application Data

(60) Provisional application No. 62/331,634, filed on May 4, 2016.

(51) Int. Cl.
| | |
|---|---|
| *H01Q 1/22* | (2006.01) |
| *G01F 23/38* | (2006.01) |
| *H04B 7/24* | (2006.01) |
| *H01Q 1/12* | (2006.01) |

(52) U.S. Cl.
CPC ............ *H01Q 1/225* (2013.01); *G01F 23/38* (2013.01); *H01Q 1/12* (2013.01); *H04B 7/24* (2013.01)

(58) Field of Classification Search
CPC .......... H01Q 1/225; H01Q 1/12; G01F 23/38; H04B 7/24
USPC .......................................................... 73/313
See application file for complete search history.

(56) References Cited

U.S. PATENT DOCUMENTS

| | | | |
|---|---|---|---|
| 8,816,651 B1 * | 8/2014 | Fell | H02P 9/006 322/21 |
| 10,063,175 B2 | 8/2018 | Frampton | |
| 10,181,770 B2 | 1/2019 | Janscha et al. | |
| 10,203,373 B1 | 2/2019 | Horst et al. | |

(Continued)

FOREIGN PATENT DOCUMENTS

| | | |
|---|---|---|
| WO | WO-2013/112590 | 8/2013 |
| WO | WO-2018/183506 | 10/2018 |

OTHER PUBLICATIONS

U.S. Appl. No. 16/569,282, Janscha et al.

(Continued)

*Primary Examiner* — Natalie Huls
*Assistant Examiner* — Monica S Young
(74) *Attorney, Agent, or Firm* — Foley & Lardner LLP (57) ABSTRACT

A portable generator is disclosed including a mounting arrangement for positioning a wireless communication device on a control panel of the portable generator. The mounting arrangement includes a mounting platform formed from a composite material where the mounting platform is secured to a rear surface of a front panel of the control panel assembly. The front panel includes a transmission cutout. The mounting platform includes a transmission window such that a wireless antenna of the wireless communication device can be aligned with the transmission cutout. The portable generator further includes a fuel sensing device that generates both a visual indication and an output signal indicative of the level of fuel in a fuel tank. The output signal can be transmitted by the wireless communication device to a remote location for remote fuel monitoring.

8 Claims, 6 Drawing Sheets

(56) References Cited

U.S. PATENT DOCUMENTS

| | | |
|---|---|---|
| 10,319,207 B1 | 6/2019 | Janscha et al. |
| 10,475,319 B2 | 11/2019 | Janscha et al. |
| 2003/0080906 A1* | 5/2003 | Miyasaka ............. G06F 1/1616 343/702 |
| 2008/0265844 A1 | 10/2008 | Smith et al. |
| 2011/0309053 A1* | 12/2011 | Baus .................... B23K 9/1062 219/108 |
| 2013/0187392 A1 | 7/2013 | Janscha et al. |
| 2013/0293424 A1* | 11/2013 | Zhu ....................... H01Q 1/243 343/702 |
| 2014/0091983 A1* | 4/2014 | Nakano ................... H01Q 1/24 343/906 |
| 2014/0174489 A1* | 6/2014 | Cottrell ............... A47L 15/0018 134/56 D |
| 2014/0213178 A1* | 7/2014 | Wolff ..................... H01P 11/00 455/41.1 |
| 2014/0217689 A1* | 8/2014 | Rumao .................. B62B 1/008 280/47.33 |
| 2014/0277791 A1* | 9/2014 | Lenard .................... B60K 6/20 700/287 |
| 2015/0008679 A1 | 1/2015 | Janscha et al. |
| 2015/0338386 A1 | 11/2015 | Chapman, III |
| 2016/0365773 A1 | 12/2016 | Janscha et al. |
| 2017/0309992 A1* | 10/2017 | Noori ................... H01Q 1/2258 |
| 2017/0346365 A1 | 11/2017 | Janscha et al. |
| 2018/0080392 A1 | 3/2018 | Janscha |
| 2018/0328816 A1 | 11/2018 | Schnell et al. |
| 2019/0055884 A1* | 2/2019 | Derra ....................... F02F 7/00 |
| 2019/0063373 A1 | 2/2019 | Markoski et al. |

OTHER PUBLICATIONS

U.S. Appl. No. 15/991,327, filed May 29, 2018, Janscha et al.
U.S. Appl. No. 16/498,816, filed Mar. 28, 2018, Janscha et al.
U.S. Appl. No. 16/567,925, filed Sep. 11, 2019, Willer et al.
U.S. Appl. No. 62/397,733, filed Sep. 21, 2016 Janscha et al.
U.S. Appl. No. 62/453,823, filed Feb. 2, 2017, Janscha et al.
U.S. Appl. No. 62/455,373, filed Feb. 6, 2017, Janscha et al.
U.S. Appl. No. 62/477,817, filed Mar. 28, 2017, Janscha et al.
U.S. Appl. No. 62/512,623, filed May 30, 2017, Janscha et al.
U.S. Appl. No. 62/730,352, filed Sep. 12, 2018, Janscha et al.

* cited by examiner

MOUNTING ARRANGEMENT FOR WIRELESS COMMUNICATION BOARD FOR A PORTABLE GENERATOR

CROSS REFERENCE TO RELATED APPLICATIONS

The present application is based on and claims priority to U.S. Provisional Patent Application Ser. No. 62/331,634, filed May 4, 2016, the disclosure of which is incorporated herein by reference.

BACKGROUND

The present disclosure generally relates to a mounting arrangement for a wireless communication device on or within a control panel of a generator. More specifically, the present disclosure relates to a mounting arrangement that allows a circuit board of the wireless communication device to be positioned in a desired location to optimize the transmission path for wireless signals from the antenna of the wireless communication device.

Portable generators have become popular as a source of limited amounts of power for short-term use. For example, portable generators are often connected to homes or businesses to provide power in situations where the normal power source (e.g. utility power grid) fails. Portable generators generally include a prime mover that provides mechanical power through a generator or alternator that includes a rotor that rotates to generate usable electricity. Since the portable generator is located outside of a home, a user or home occupant must monitor the fuel level within the standby generator during extended periods of operation. Typically, the portable generator includes a visible fuel gauge that can be viewed from above the standby generator. This type of fuel monitoring requires the user to be present at the portable generator to determine the fuel level.

SUMMARY

The present disclosure generally relates to a mounting arrangement for positioning a wireless communication device within the control panel of a generator. The mounting arrangement allows the wireless communication device to communicate through a metallic front panel of the control panel assembly.

The mounting arrangement of the present disclosure is used to position a wireless communication device with a control panel assembly of a portable generator. The control panel assembly includes a metallic front panel and a rear cover that combine to define a sealed enclosure. The front panel of the control panel assembly includes a transmission cutout, which is a removed portion of the metallic material that forms the front panel.

The mounting arrangement of the present disclosure includes a mounting platform that is formed from a composite material. The composite material provides the required support for a circuit board that includes the wireless transmission device. Specifically, the wireless transmission device includes a wireless antenna that is operable to transmit wireless information from the wireless transmission device and receive wireless control and command signals.

The mounting platform is preferably mounted to a rear surface of the front panel such that the wireless antenna is aligned with the removed transmission cutout. The mounting platform can include a transmission window which is also formed from the composite material. When the mounting platform is attached to the rear surface of the front panel, the transmission window is aligned with the transmission cutout. When aligned, the wireless antenna is able to transmit and receive wireless signals through both the composite transmission window and the transmission cutout formed in the metallic front panel.

The mounting arrangement of the present disclosure can be utilized with a portable generator to transmit information from the portable generator and receive commands/signals used to control the operation of the portable generator. The portable generator includes the control panel assembly including the front panel. The front panel includes the removed transmission cutout which is aligned with the transmission window of the mounting platform. In this manner, the wireless communication device is able to communicate through the front panel formed from metallic material.

In yet another aspect of the present disclosure, the portable generator can include a fuel sensing device. The fuel sensing device includes an electronic sensing arrangement that generates an output signal that is proportional to the level of fuel in a fuel tank. The fuel sensing device further includes a visual indicator that displays the level of fuel in the fuel tank such that the level of fuel can be determined by looking at the visual indicator.

The fuel sensing device further includes a communication wire that is coupled to a wireless communication device such that the wireless communication device can transmit the level of fuel in the fuel tank away from the portable generator. The wireless communication device can be mounted to the rear surface of a control panel assembly.

In one embodiment of the disclosure, the fuel sensing device includes an electronic sensing arrangement that includes a pivoting pendulum that includes a magnet that moves relative to a stationary Hall Effect sensor. The stationary Hall Effect sensor generates an output voltage based upon the position of the magnet, which is indicative of the fuel level. In one embodiment of the disclosure, the output voltage of the Hall Effect sensor is linear relative to the fuel level.

BRIEF DESCRIPTION OF THE DRAWINGS

The drawings illustrate the best mode presently contemplated of carrying out the disclosure. In the drawings.

DETAILED DESCRIPTION

Figure 1:
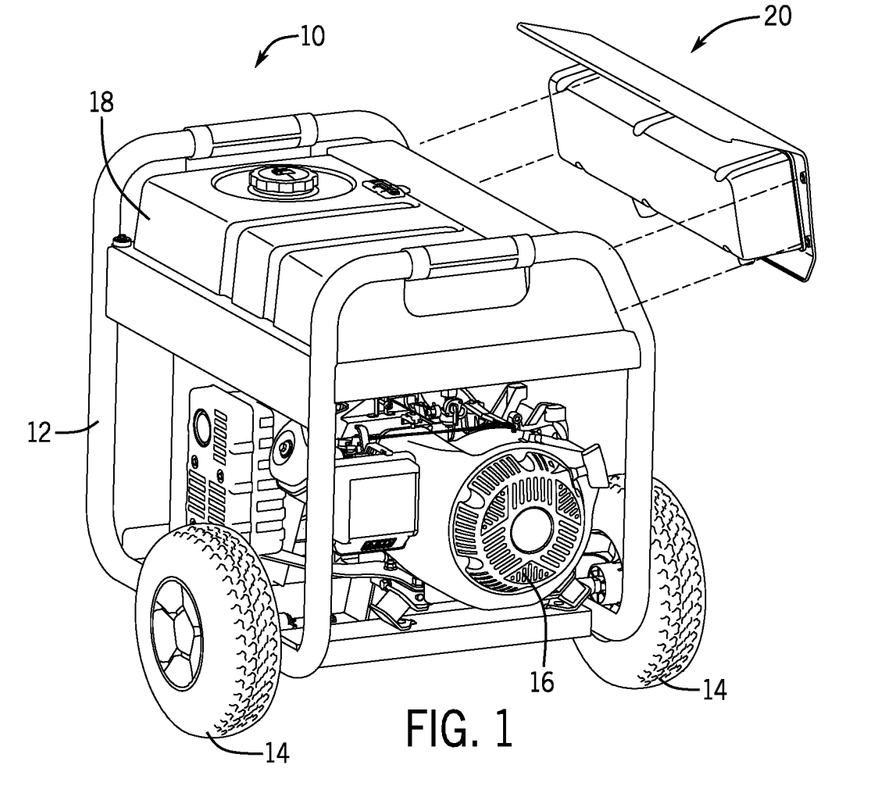
FIG. 1 is a perspective view of a portable generator.

FIG. 1 illustrates a portable generator 10 constructed in accordance with the present disclosure. The portable generator 10 includes a support frame 12 that includes a pair of wheels 14 that allow the portable generator to be moved to a desired location. The portable generator includes an internal combustion engine 16 that can be operated to rotate an alternator to supply a source of electricity to a home or any other location that is not connected to a utility power source. The portable generator 10 includes a fuel tank 18 that is mounted to the support frame 12 to provide a source of fuel to the internal combustion engine 16. The portable generator 10 includes output receptacles (not shown) that allow the portable generator to function as an AC power source for connected electrical appliances or devices.

As illustrated in FIG. 1, the portable generator 10 includes a control panel assembly 20 mounted to a front face of the support frame 12. The control panel assembly 20 provides operational controls for the portable generator 10, as is conventional and as more clearly shown in FIG. 3.

Figure 2:
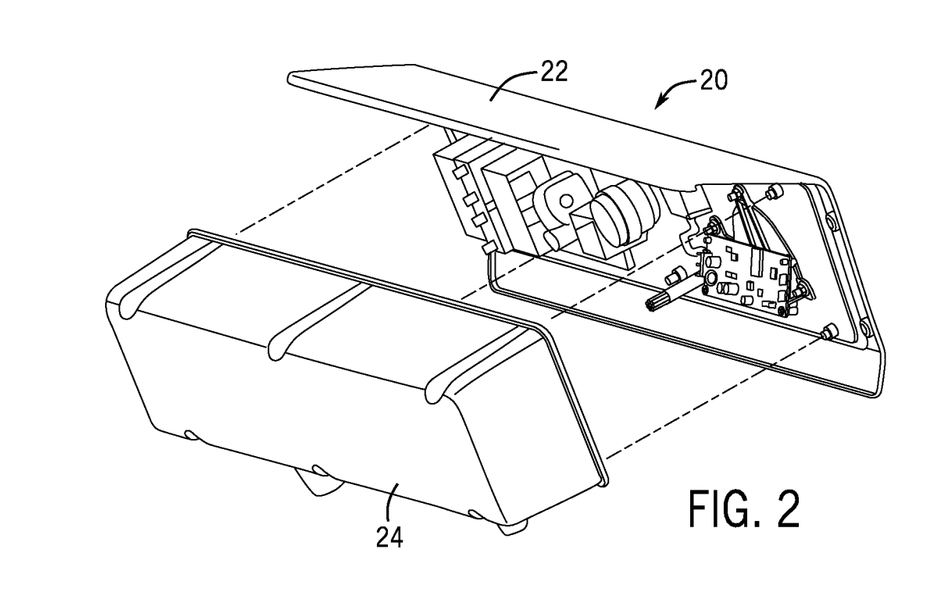
FIG. 2 is a magnified, exploded view of the control panel assembly.

As illustrated in FIG. 2, the control panel assembly 20 includes a front panel 22 that is formed from a metallic material. A rear cover 24 is mounted to the front panel 22. The rear cover 24 is mounted to the front panel 22 to provide a water resistant enclosure for the operating components of the control panel assembly.

Figures 4A, 4B:
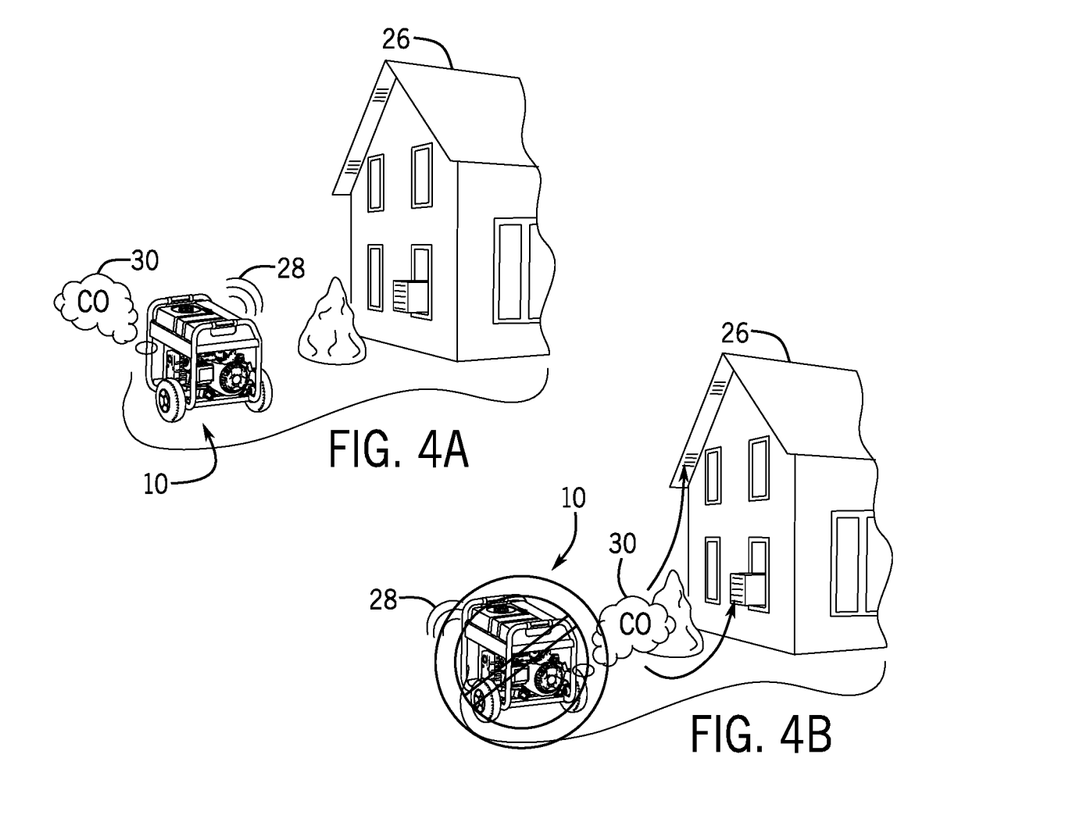
FIG. 4A is a schematic illustration of the portable generator positioned at a desired orientation near a home.
FIG. 4B is a schematic illustration of the portable generator at a non-preferred orientation located next to a home.

As shown in FIG. 4A, the portable generator 10 can be positioned outside of a home 26 to provide a source of electrical power to power appliances, air conditioners and other electrical devices within the home 26. In accordance with the present disclosure, the portable generator 10 is designed to include a wireless transmission device to transmit wireless signals 28 for receipt by wireless enabled devices that can be located either within the home 26 or within the close vicinity to the portable generator 10. The wireless transmission device can be configured to both transmit and receive wireless signals from either within the home 26 or from a close vicinity to the portable generator 10. In this manner, the wireless transmission device can report the operation status of the generator 10 and allow for limited or full remote operational control of the portable generator 10.

In the embodiment shown in FIG. 4A, the portable generator 10 is at a preferred orientation such that the exhaust 30 emitted by the internal combustion engine 16 is directed away from the home. In this orientation, the wireless communication device that forms part of the portable generator 10 is directed toward the home 26 to enhance the range of the wireless communication device toward the home 26. In the embodiment shown in FIG. 4B, the orientation of the portable generator 10 is reversed such that the exhaust 30 is vented toward the home 26 while the wireless transmitter is directed away from the home. The orientation shown in FIG. 4B is a non-preferred orientation and will be discouraged in accordance with one aspect of the present disclosure.

Figure 6:
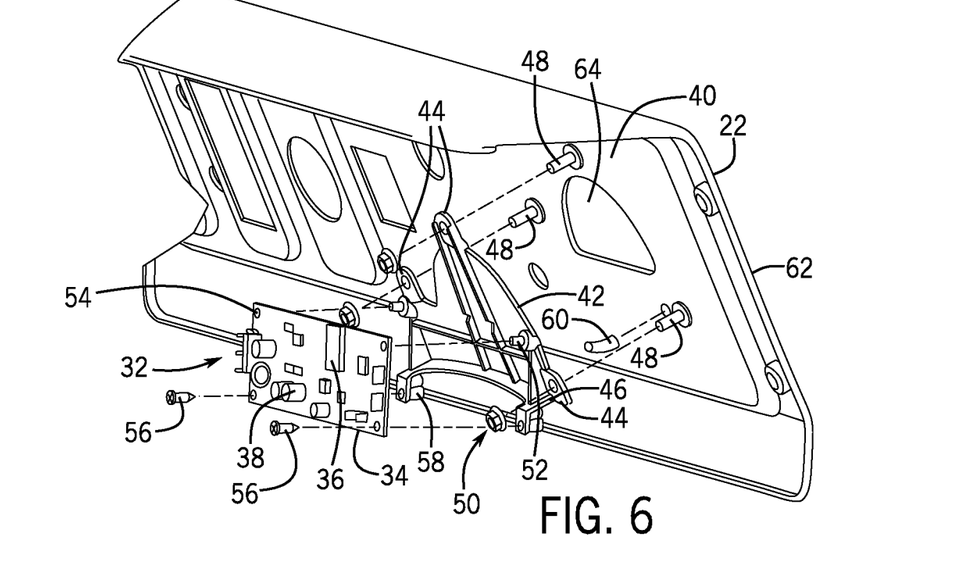
FIG. 6 is a back perspective view of the front panel and the wireless communication device mounting components.
Figure 7:
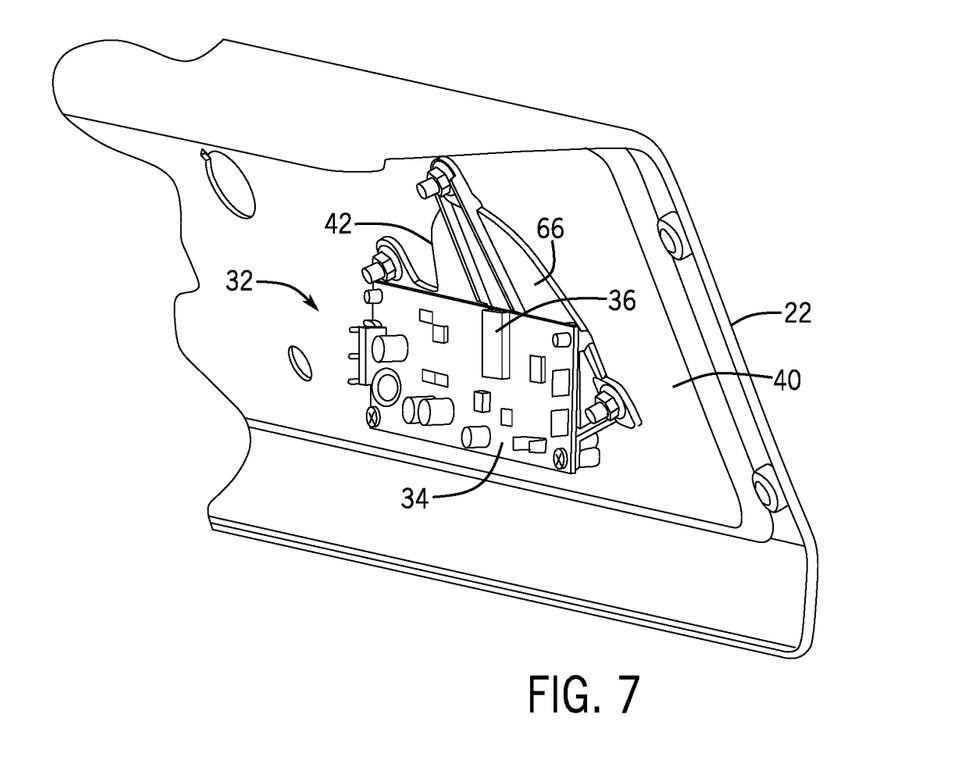
FIG. 7 is an assembled view similar to FIG. 6.

Referring now to FIGS. 6 and 7, the mounting details of the wireless communication device 32 will be described. As illustrated in FIG. 6, the wireless communication device 32 includes a printed circuit board 34 that provides an electrical mounting location for all of the electrical components that form the wireless communication device 32. These electrical components include a wireless antenna 36. In the embodiment illustrated, the wireless antenna 36, along with the electronic circuitry 38, is designed to transmit and receive wireless signals utilizing a Bluetooth® communication protocol. The Bluetooth communication protocol is particularly desirable since a wide variety of currently available "smart devices", such as tablets and smartphones, include Bluetooth receiving and transmitting circuitry. The Bluetooth communication protocol thus allows the portable generator 10 to communicate wirelessly to any Bluetooth-enabled device located within the transmission range of the wireless communication device 32. Although Bluetooth is currently contemplated as the preferred wireless communication protocol, it is contemplated that other types of wireless communication protocols could be utilized while operating within the scope of the present disclosure.

Referring back to FIG. 6, the front panel 22 of the control panel assembly includes a back surface 40. The back surface 40 provides a mounting location for the wireless communication device 32. Since the front panel 22 is formed from a metallic material, the metallic material will interfere with the wireless transmission from the wireless antenna 36. In order to enhance the communication range of the wireless antenna 36, a unique mounting arrangement for the wireless communication device 32 is shown. Specifically, the mounting arrangement includes a mounting platform 42 that is formed from a composite material, such as plastic. The composite material that forms the mounting platform 42 allows the wireless transmission signals from the wireless antenna 32 to pass through the mounting platform 42 with little to no attenuation. As shown in FIG. 6, the mounting platform 42 includes a plurality of mounting tabs 44 that each includes a mounting hole 46 that receives one of the studs 48 securely attached to the back surface 40 of the front panel 22. Each of the studs 48 receives a flange nut 50 to secure the mounting platform 42 in the position illustrated.

The mounting platform 42 includes a pair of upper mounting studs 52 that are each received within top mounting openings 54 formed in the circuit board 34. The upper mounting studs 52 are intended to be heat staked to retain the upper portion of the circuit board 34 without the need for any other fasteners. A pair of self-tapping screws 56 are each received within a mount 58 formed near the lower end of the mounting platform 42. In this manner, the wireless circuit board 34 can be securely attached to the mounting platform 42. The configuration of the mounting arrangement for the wireless circuit board 34 can be modified depending upon the desired position and orientation of the circuit board 34, and specifically the position and orientation of the wireless antenna 36. The location and orientation of the wireless antenna 36 can be modified by simply changing the mounting arrangement for the circuit board 34. In addition, the location of the wireless antenna 36 on the circuit board 34 could be modified to change the wireless transmission.

Figure 3:
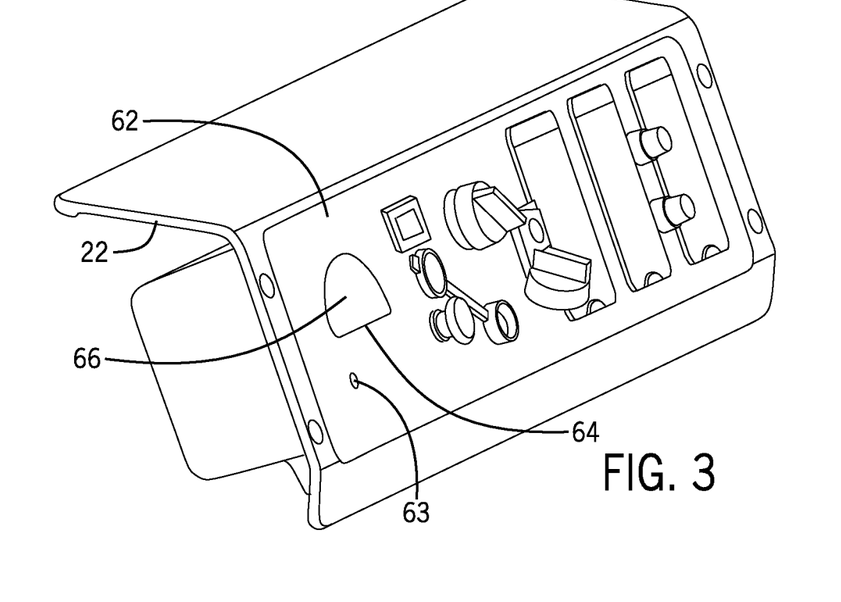
FIG. 3 is a front view of the control panel.

As illustrated in FIG. 6, one or more light pipes 60 extend from the back surface 40 of the front panel 22. The light pipes 60 are positioned to provide a light path for an LED formed on the circuit board 34 such that the light emitted from the LED on the circuit board 34 can be viewable from the front surface 62 of the front panel 22. FIG. 3 illustrates the LED viewing opening 63 on the front surface 62.

As can be understood in FIG. 6, the front panel 22 includes a transmission cutout 64. The transmission cutout 64 provides a transmission path for the wireless transmission signals from the wireless antenna 36 to pass through the metallic front panel 22.

As illustrated in FIG. 7, when the mounting platform 42 is securely attached to the back surface 40, a transmission window 66 of the mounting platform 42 covers the transmission cutout formed in the front panel 22. The transmission window 66 is formed from the same composite material which allows wireless signals from the wireless antenna 36 to pass through the transmission window 66. As illustrated in FIG. 7, the wireless antenna 36 is positioned in an optimal location relative to the transmission window 66 to optimize the communication range of the wireless antenna 36.

As shown in FIG. 3, the transmission cutout 64 surrounds the transmission window 66. In order to keep the interface water-tight, a decal or some other type of sealing arrangement can be used to cover the interface between the transmission cutout 64 and the transmission window 66. The front surface 62 of the front panel 22 includes the various operational controls needed to operate the portable generator.

Although not shown in the embodiment of FIGS. 6-7, the wireless communication device 32 is connected to the control circuitry contained within the control panel such that the wireless communication device 32 can receive signals and information from the operating controller within the control panel and relay received commands/requests. The communication between the wireless communication device 32 and the control circuitry can be through a wired connection or, in a contemplated embodiment, through close-range wireless communications. As discussed previously, the rear cover 24 is connected to the back surface of the front panel to provide a water-tight enclosure.

Figure 5:
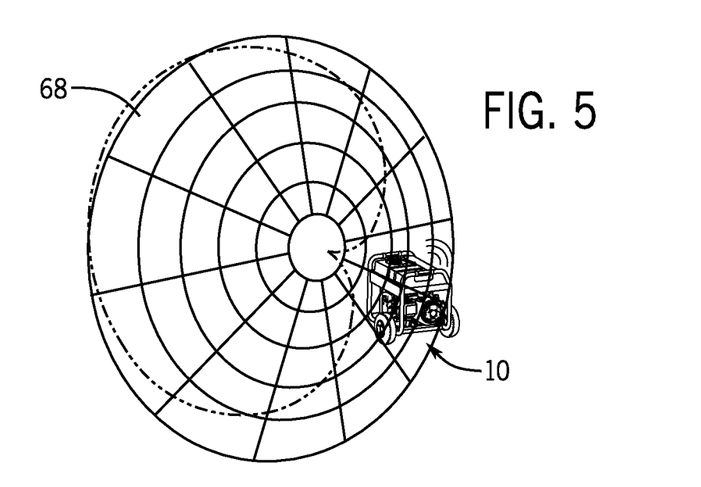
FIG. 5 is a transmission profile illustration for the wireless antenna.

FIG. 5 provides a schematic illustration of the wireless communication range 68 from the portable generator 10 utilizing the mounting arrangement described in FIGS. 6 and 7. The configuration of the wireless communication range 68 can be modified by adjusting the position of the circuit board 34 and the location of the wireless antenna 36 within the portable generator. Although FIG. 5 illustrates one schematic illustration of the wireless communication range, it is contemplated that the wireless antenna could be replaced with an omni-directional antenna such that the communication range for the portable generator would be in every direction. However, it is contemplated that a one-directional communication range, as shown in FIG. 5, could be desirable to ensure the proper orientation of the portable generator 10, as was described in FIGS. 4A and 4B.

Figure 8:
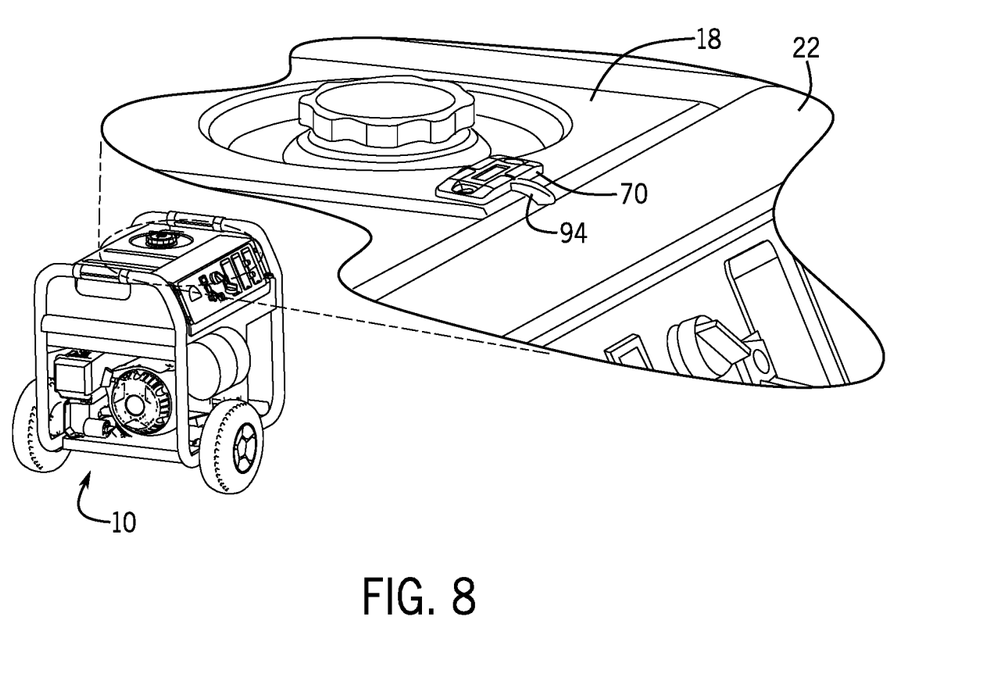
FIG. 8 is a magnified view of the fuel sending unit mounted to a fuel tank.

Referring now to FIG. 8, thereshown is another aspect of the present disclosure. In the embodiment shown in FIG. 8, a fuel sensing unit (FSU) 70 is mounted to the fuel tank 18 for communicating fuel related information to the wireless communication device contained within the control panel assembly 20. The FSU 70 is able to provide both a visual indication of the fuel level contained within the fuel tank 18 and an electrical signal that is proportional to the fuel level within the fuel tank 18.

Figure 9:
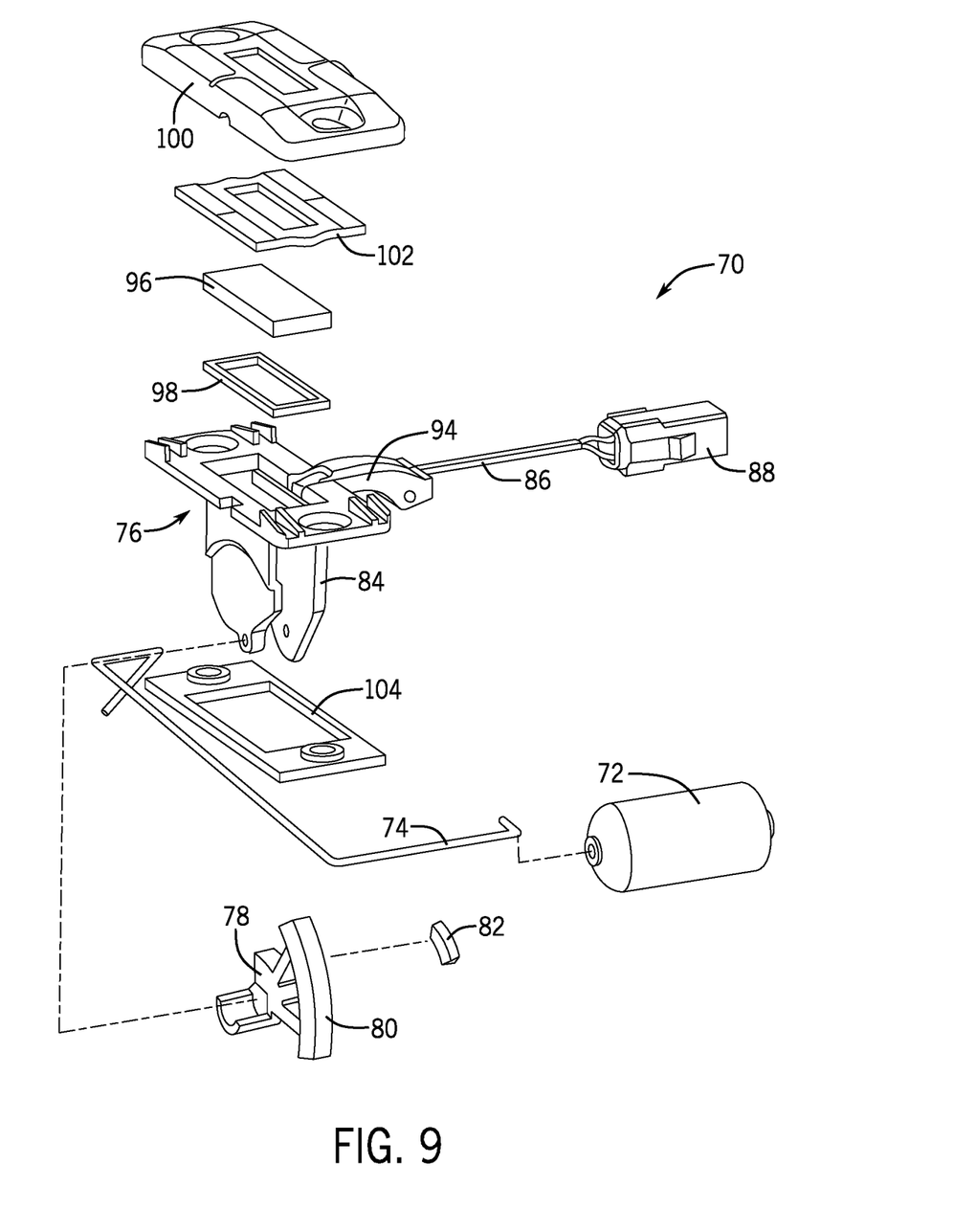
FIG. 9 is an exploded view of the fuel sending unit.

FIG. 9 provides an exploded view of the FSU 70 constructed in accordance with the present disclosure. Although one specific embodiment of the FSU 70 is shown, it should be contemplated that various other alternate arrangements could be constructed while operating within the scope of the present disclosure.

As illustrated in FIG. 9, the fuel sensing unit 70 includes a float 72 that is contained within the fuel tank and floats on the top surface of the fuel within the fuel tank. The float 72 is connected to a float arm 74 which is pivotally supported by the lowermost end of the base 76. The float arm 74 also passes through a pendulum 78 that includes a display surface 80. The display surface 80 includes indicator marks such that a user can visually determine the amount of fuel remaining in the fuel tank. The use of such a pendulum having a display surface 80 is well known in the art.

As illustrated in FIG. 9, the pendulum includes a permanent magnet 82 mounted to the pendulum for rotating movement with the pendulum as the level of fuel within the fuel tank changes. In accordance with the present disclosure, a Hall Effect sensor is mounted within one of the legs 84 of the base 76. The Hall Effect sensor contained within one of the legs 84 is thus protected from the fuel within the fuel tank. The location of the Hall Effect sensor on the 'dry side' of the FSU reduces the amount of potential contamination to the sensor as compared to fuel sensing devices that are on the fuel side of the sensing device. A series of wires 86 extend from a connector 88 to the Hall Effect sensor. The wires 86 include a pair of communication wires and a power wire. The power wire provides the required voltage to allow for operation of the Hall Effect sensor.

Figure 10:
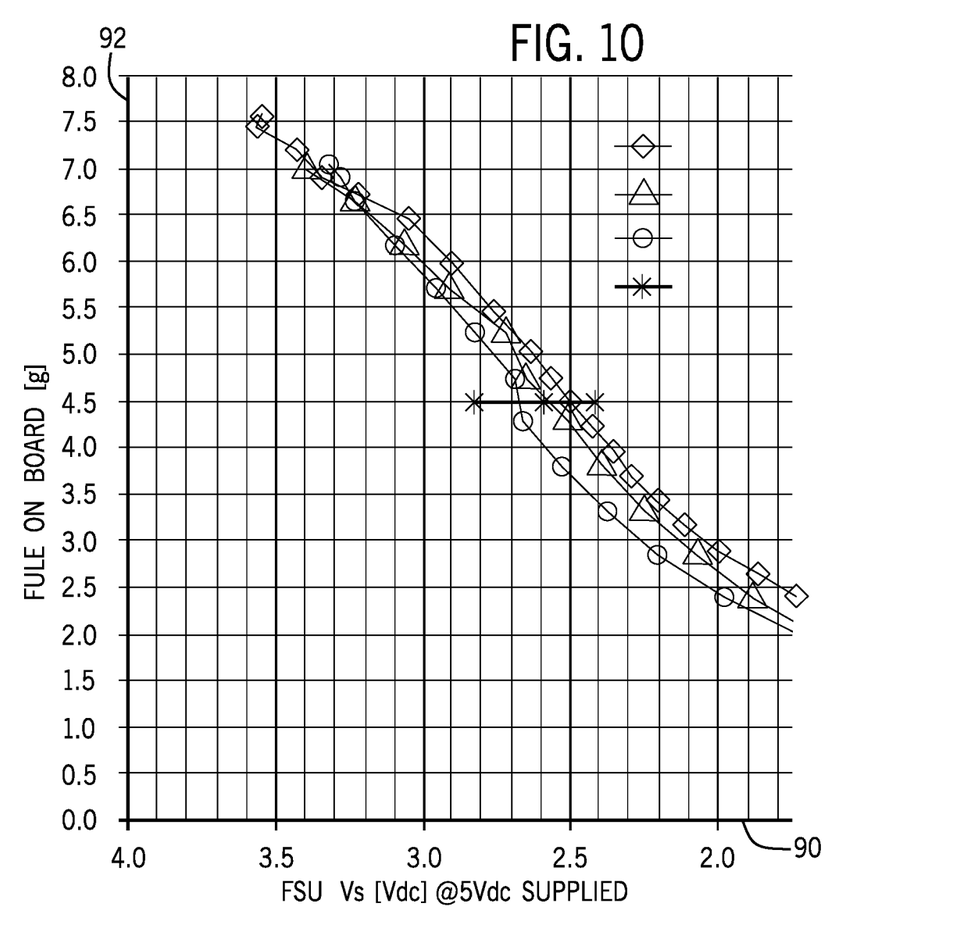
FIG. 10 is a graph illustrating the relationship between the output signal and fuel level.

The Hall Effect sensor generates a changing voltage depending upon the location of the permanent magnet 82 relative to the Hall Effect sensor. As the magnet 82 moves due to a changing fuel level, the Hall Effect sensor generates a changing voltage. FIG. 10 provides an illustration of the changing output voltage 90 relative to the fuel level 92. As illustrated in FIG. 10, the Hall Effect sensor generates a nearly linear output signal. The output signal from the Hall Effect sensor is communicated to the wireless communication device through the connector 88. As illustrated in FIG. 8, the signal wires are protected by both the close proximity to the control board within the control panel assembly and by the wire conduit 94 that is integrally fashioned into the base 76. The signal wires pass into the water resistant enclosure created by the back cover 24. In this manner, the fuel level signal from the FSU 70 can be transmitted first to the wireless transmission device and then can be wirelessly transmitted from the portable generator utilizing the wireless communication device.

Referring back to FIG. 9, the display surface 80 of the pendulum 78 can be viewed through a sight glass 96. A gasket 98 provides a water-tight seal between the sight glass 96 and the base 76. A cover member 100 and intermediate pad 102 protect the sight glass 96 as illustrated. The gasket 104 provides a fluid-tight seal between the base 76 and the top surface of the fuel tank.

Although the FSU 70 provides an output voltage that is linearly related to the fuel level, alternate embodiments are contemplated that could utilize a shaped magnet such that the flux non-linearity cancels out the mechanical non-linearity of the mounting system.

Although the wireless communication device 32, including the circuit board 34 and antenna 36, are shown mounted within the control panel, it is contemplated that the wireless communication device could be combined with the FSU 70 to form a self contained unit that could be retrofit to existing portable generators to provide wireless connectivity for such generators.

As can be understood in the drawing figures, the wireless communication of the fuel level utilizing the Bluetooth communication protocol allows various different application software operating on a smart device to predict different parameters of the portable generator. As an example, application software can be developed to predict the amount of runtime remaining for the portable generator before the fuel is depleted, calculate the amount of fuel left in the fuel tank and monitor the runtime of the standby generator. In addition, since the wireless communication device is in communication with the control circuitry of the control panel, other information, such as the voltage being generated by the generator, the amperage draw on the generator and the frequency of the generator can be wirelessly transmitted to a user.

As can be understood by the above description, the mounting arrangement of the present disclosure allows the orientation of the wireless communication device, and specifically the wireless antenna, to be optimized for each individual type of portable generator.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A mounting arrangement for positioning a wireless communication device on a control panel of a portable generator, comprising:
   a removed transmission cutout formed in the control panel;
   a mounting platform supported on a back surface of the control panel and formed from a plastic material, the mounting platform including a transmission window aligned with the transmission cutout;
   a circuit board supported on the mounting platform; and
   a wireless antenna mounted to the circuit board for transmitting wireless signals from the portable generator, wherein the mounting platform is supported on the control panel such that the wireless antenna is aligned with the transmission cutout.

2. The mounting arrangement of claim 1 wherein the mounting platform is mounted behind the control panel of the portable generator.

3. The mounting arrangement of claim 2 wherein the control panel is formed from a metallic material.

4. The mounting arrangement of claim 3 wherein the control panel is mounted to a rear cover to define a sealed enclosure.

5. The mounting arrangement of claim 4 wherein the circuit board and wireless antenna are both contained within the sealed enclosure.

6. A portable generator, comprising:
   a wireless communication device;
   a control panel assembly including a front panel formed from a metallic material and having a removed transmission cutout;
   a mounting platform formed from a plastic material and mounted to a back surface of the front panel for positioning the wireless communication device behind the front panel of the control panel assembly, the mounting platform including a transmission window aligned with the transmission cutout;
   a circuit board supported on the mounting platform; and
   wherein the wireless communication device includes an antenna mounted to the circuit board and in alignment with the transmission cutout, the wireless communication device being operable to communicate wireless signals from the portable generator.

7. The portable generator of claim 6 wherein the control panel assembly includes a rear cover, wherein the front panel is mounted to the rear cover to define a sealed enclosure.

8. The portable generator of claim 7 wherein the circuit board and wireless communication device are both contained within the sealed enclosure.

* * * * *